(12) United States Patent
Kuno et al.

(10) Patent No.: US 6,538,242 B1
(45) Date of Patent: Mar. 25, 2003

(54) METHOD OF MEASURING SPECTRAL RESPONSIVITY CHARACTERISTIC OF IMAGE PICK-UP DEVICE AND METHOD OF CONFIGURING IMAGING DATA

(75) Inventors: Tetsuya Kuno, Tokyo (JP); Hiroaki Sugiura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/407,071

(22) Filed: Sep. 28, 1999

(30) Foreign Application Priority Data

Sep. 28, 1998 (JP) .......................................... 10-273280

(51) Int. Cl.[7] .............................................. H01L 27/00
(52) U.S. Cl. ..................... 250/208.1; 250/226; 348/182
(58) Field of Search ................................ 358/516, 521, 358/518, 519, 455, 406; 348/180, 181, 182, 254, 251, 223; 250/208.1, 226

(56) References Cited

U.S. PATENT DOCUMENTS

| | | | |
|---|---|---|---|
| 4,962,425 A | * 10/1990 | Rea ............................. | 358/139 |
| 5,038,205 A | * 8/1991 | Kondo et al. ................. | 358/29 |
| 5,561,494 A | * 10/1996 | Terashita ..................... | 355/38 |
| 5,760,829 A | 6/1998 | Sussmeier | |

FOREIGN PATENT DOCUMENTS

WO         WO9828919         7/1998

OTHER PUBLICATIONS

Section 3, Clause 18 of "International Standard IEC1146–1 Video cameras (PAL/SECAM/NTSC) Methods of Measurement—Part 1: Non-broadcasting single sensor cameras" published by International Standard by IEC (International Electrotechnical Commission) in May, 1994 pp 39–45, 95, 97, 99, 101, 103, 105, 107, 155, 173, 175.

* cited by examiner

Primary Examiner—Stephone Allen
Assistant Examiner—Eric Spears
(74) Attorney, Agent, or Firm—Birch, Stewart, Kolasch & Birch, LLP

(57) ABSTRACT

A spectroscope (2) spectrally separates a light from a light source (3) and outputs the separated light from an emitting terminal (6) thereof. An image pick-up device (1) having a solid-state image sensor picks-up an image of the emitting terminal (6). First operation means (7) performs a correction to each of plural image signals corresponding to plural pixels that are outputted by the image pick-up device (1) so that a gradation characteristic of the image pick-up device (1) is corrected from non-linearity to one closer to linearity. Second operation means (8) calculates, as a spectral responsivity characteristic for the separated light, a mean value of the plural image signals after the correction by averaging the same over a certain range within the plural pixels. As a result, the spectral responsivity characteristic of the image pick-up device (1) is measured precisely.

8 Claims, 14 Drawing Sheets

METHOD OF MEASURING SPECTRAL RESPONSIVITY CHARACTERISTIC OF IMAGE PICK-UP DEVICE AND METHOD OF CONFIGURING IMAGING DATA

BACKGROUND OF THE INVENTION

1. Field of the Invention

The present invention relates to a technique for measuring spectral responsivity of an image pick-up device such as a digital camera, a digital still camera or the like, and to a technique for configuring imaging data suitable for being utilized when an image picked up by the image pick-up device is outputted by an image output device.

2. Description of the Background Art

Conventionally, there has been a typical device and method of measuring color characteristic of an image pick-up device which has been described in Section 3, Clause 18 of "International Standard IEC1146-1 Video cameras (PAL/SECAM/NTSC) Methods of Measurement—Part 1: Non-broadcasting single sensor cameras" published by International Standard by IEC (International Electrotechnical Commission) in May, 1994 as an international standard.

FIG. 20 is a diagram showing application of the above-mentioned image pick-up device and method, illustrating a structure of a device for measuring a color reproducibility and gradation characteristic of a digital still camera used as an example of an image pick-up device. FIG. 20 shows an image pick-up device 1 and a test chart 20 which is a subject of the image pick-up device 1. FIG. 20 also shows an illumination light source 21 having a stable color temperature and for illuminating the test chart 20, and an image output device 15 for receiving data output from the image pick-up device 1, for example, a computer or the like.

FIG. 21 is a diagram showing a structure of the test chart 20 including, as reference colors, a gray scale 30 having white, black and grays changing stepwise from white to black, and several color charts 31 such as red, green, blue and the like. Examples of the color charts 31 have characteristics defined in Annex A, B of the above-mentioned International Standard.

It is assumed that an RGB value of each color chart 31 of the test chart 20 shown in FIG. 21 is well known and is a theoretical value (for example, if data has 8 bits, ideally, red has R=255 and G=B=0, green has G=255 and R=B=0, and blue has B=255 and R=G=0). By calculating differences (color differences) between the R, G and B values corresponding to each color chart 31 measured when the image of the test chart 20 is picked up by the image pick-up device 1 and the theoretical R, G and B values, the color reproducibility of the image pick-up device 1 can be evaluated. The gradation characteristic of the image pick-up device 1 can be found based on measured values acquired when the gray scale 30 changing stepwise from white to black is picked up by the image pick-up device 1.

However, an illuminance of the chart 20 illuminated by the illumination light source 21 is varied in positions on the chart 20. Therefore, even if the image of the same color chart 31 is picked up, a measured value is varied in positions on the chart 20. For this reason, there has been a problem in that uneven illumination should be corrected to obtain an accurate value.

Even under ideally even illumination, the measured values are varied due to a difference in a light quantity between a central portion and a circumferential portion, for example, depending on the characteristics of an image pick-up optical system of the image pick-up device even if the image of the same color chart 31 is picked up. Therefore, there has been a first problem in that the characteristics of the image pick-up optical system of the image pick-up device should be well known and should be corrected to obtain an accurate value.

Moreover, if the test chart 20 is a printed matter, a deterioration with age such as fading, discoloration or the like is caused. Therefore, there has been a problem in that it is hard to perform measurement with a high reproducibility.

Furthermore, there has been a drawback that the color difference between the measured R, G and B values for each color chart on the test chart 20 and the theoretical R, G and B values can be obtained but a spectral responsivity characteristic of the image pick-up device for each wavelength cannot be measured. The spectral responsivity characteristic of an image pick-up device refers to the response of the device to light as a function of light wavelength. In other words, the relationship between image signal intensity for the image pick-up device and light wavelength (i.e., spectrum dependency of an image signal) represents the spectral responsivity characteristic of the image pick-up device.

Another problem is that the image pick-up device cannot perform color correction with high precision for the images of general subjects with information obtained from only a limited variety of images.

There has been another drawback that a work for separately making a correspondence list or the like is required to correlate data measured by a color characteristic measuring device with an image picked up by the image pick-up device.

If the type of the illumination light source 21 (spectral distribution characteristic) is changed, the data corresponding to individual color charts picked up by the image pick-up device are also changed. Conventionally, there has not been means for accurately reflecting the individual characteristics of the illumination light source 21. Therefore, there has been a drawback that it is hard to perform color management of the image pick-up device including the illumination light source 21. For the above-mentioned reason, particularly, there has not been a method of accurately measuring the spectral distribution characteristic of the image pick-up device. Therefore, even if the spectral responsivity characteristic of the light source or the like is accurately measured, it is impossible to perform the color management effectively utilizing the spectral responsivity characteristic.

SUMMARY OF THE INVENTION

A first aspect of the present invention is directed to a method of measuring spectral responsivity characteristic of image pick-up device. The method comprises steps of: (a) preparing an image pick-up device having an image sensor including plural pixels arranged, a light source, and a spectroscope for spectrally separating a light from said light source and outputting separated light from an emitting terminal thereof; (b) picking-up an image of said emitting terminal which is outputting said separated light by said image pick-up device; (c) performing a correction to each of plural image signals corresponding to at least one color component and said plural pixels that are outputted by said image pick-up device during said step (b) so that a gradation characteristic of said image pick-up device is corrected from non-linearity to one closer to linearity; and (d) calculating, as a spectral responsivity characteristic for said separated light, a mean value of said plural image signals after said correction by averaging the same over a certain range within said plural pixels.

Preferably, varying a wavelength of said separated light, said step (b), (c), and (d) are repeatedly executed so as to obtain said spectral responsivity characteristic for plural wavelengths.

Preferably, in said step (c), a value of an inversion function of a function that expresses said non-linearity in said gradation characteristic is calculated for each of said plural image signals whereby said correction is performed.

Preferably, in said step (d), using a spectral characteristic that expresses an intensity of said separated light for each of said plural wavelengths, said mean value is corrected as said spectral responsivity characteristic so as to reduce an influence of difference in said intensity among said plural wavelengths.

Preferably, in said step (a), another light source for illuminating said emitting terminal is further prepared, in said step (b), illuminating said emitting terminal with said another light source, said image of said emitting terminal is picked-up by said image pick-up device, and in said step (c), in addition to said correction, another correction to subtract a signal component resulting from said another light source is performed to each of said plural image signals.

Preferably, in said step (a), a box that has a hole selectively opened where said separated light passes from said emitting terminal to said image pick-up device and an illumination light source for emitting such an illumination light as to reach said hole and a portion of a surface of said box surrounding said hole but not to reach said emitting terminal are further prepared, and said method further comprises a step of (e) sequentially fitting plural color chips having different reflectances in said hole, while picking-up images of said plural color chips with said image pick-up device, and thereby measuring said non-linearity in said gradation characteristic on a basis of image signals sequentially output by said image pick-up device.

A second aspect of the present invention is directed to a method of configuring imaging data. The method comprises steps of: (A) preparing a image-pick up device; (B) obtaining an image data that represents an image of a subject as an output signal of said image pick-up device; and (C) adding a data that represents a spectral responsivity characteristic of said image pick-up device to said image data.

Preferably, said spectral responsivity characteristic is obtained by applying the method according to a first aspect of the present invention to said image-pick up device prepared in said step (A).

Preferably, the method further comprises a step of (D) adding, to said image data, a conversion coefficient between a first signal obtained from said image-pick up device when an image of a color chart is picked-up by said image pick-up device under an illumination of a standard white color and a second signal obtained from said image-pick up device when an image of said color chart is picked-up by said image pick-up device under an illumination having a particular spectral distribution characteristic.

A third aspect of the present invention is directed to a method of configuring imaging data. The method comprises steps of: (A) preparing a image-pick up device; (B) obtaining an image data that represents an image of a subject as an output signal of said image pick-up device; and (C) adding, to said image data, a conversion coefficient between a first signal obtained from said image-pick up device when an image of a color chart is picked-up by said image pick-up device under an illumination of a standard white color and a second signal obtained from said image-pick up device when an image of said color chart is picked-up by said image pick-up device under an illumination having a particular spectral distribution characteristic.

According to the first aspect of the present invention, the spectral responsivity characteristic is obtained precisely.

According to the second aspect of the present invention, an image output device for receiving the imaging data can obtain an information needed for color reproducibility to adequately perform color correction such as color matching.

According to the third aspect of the present invention, an image output device for receiving the imaging data can reproduce an image of the subject with precise color reproducibility.

It is an object of the present invention to provide a technique to accurately measure a spectral responsivity characteristic without managing an uneven illuminance, a deterioration with age, color charts and the like on the test chart.

It is another object of the present invention to provide a technique to measure a spectral responsivity characteristic without accurately finding a spectral characteristic of illumination and the like.

It is yet another object of the present invention to provide a technique to obtain a spectral responsivity characteristic required to accurately perform color reproduction of a subject.

It is a further object of the present invention to provide a technique to always know color characteristics of an image pick-up device by adding the spectral responsivity characteristic obtained from the image pick-up device to image data and to perform color correction with high precision for a general image.

It is a further object of the present invention to provide a technique to obtain an accurate spectral responsivity characteristic which does not depend on a gradation characteristic of the image pick-up device.

It is a further object of the present invention to provide a technique to obtain image data capable of accurately displaying color reproduction of a subject in an image output device.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
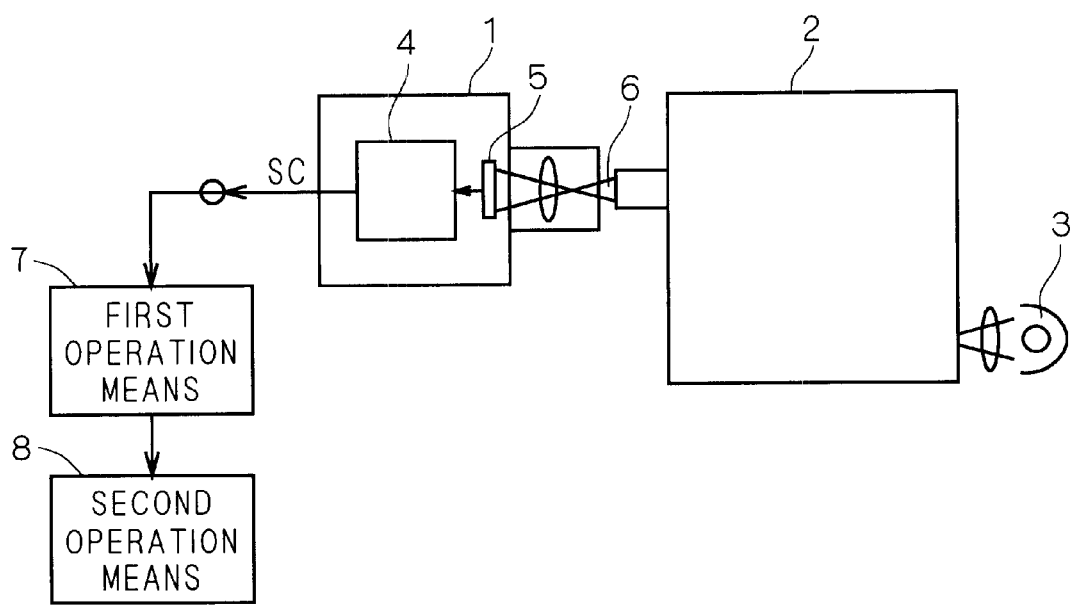
FIG. 1 is a diagram showing a device for measuring a spectral responsivity in accordance with an embodiment of the present invention.

Preferred embodiments of the present invention will be described below with reference to the drawings. In the drawings, the same reference numerals as those in the prior art denote the same or corresponding portions in the prior art.

First Embodiment

FIG. 1 is a diagram showing the outline of a measuring device for implementing a method of measuring spectral responsivity characteristic according to a first embodiment of the present invention.

FIG. 1 depicts an image pick-up device 1 which is an object to be measured, a spectroscope 2, a light source 3 for emitting light to the spectroscope 2 to be separated, a signal processing circuit 4 for performing a signal processing in the image pick-up device 1, a solid-state image sensor 5, an emitting terminal 6 for emitting the separated light from the spectroscope 2, first operation means 7 for executing a first operation on an image signal (or data) output from the image pick-up device 1, and second operation means 8 for executing a second operation on a result obtained by the first operation means 7.

Referring to the measuring device having the above-mentioned structure, the measuring method will be described below.

The spectroscope 2 has a prism and a grating (diffraction grating) therein, and spectrally separates light incident from the light source 3 into light having a single wavelength. The light source 3 is generally constituted by a lamp such as a halogen lamp and a lens for collecting light emitted from the lamp. The light having a single wavelength which is separated is emitted from the emitting terminal 6.

The image pick-up device 1 picks up an image of single light emitted from the spectroscope 2. The light whose image has been picked up is photoelectrically converted by the solid-state image sensor 5, and is subjected to a signal processing necessary for a camera signal processing at the signal processing circuit 4, for example, gamma correction and gain control, and is then output as an image signal from the emitting terminal Sc.

Figure 2:
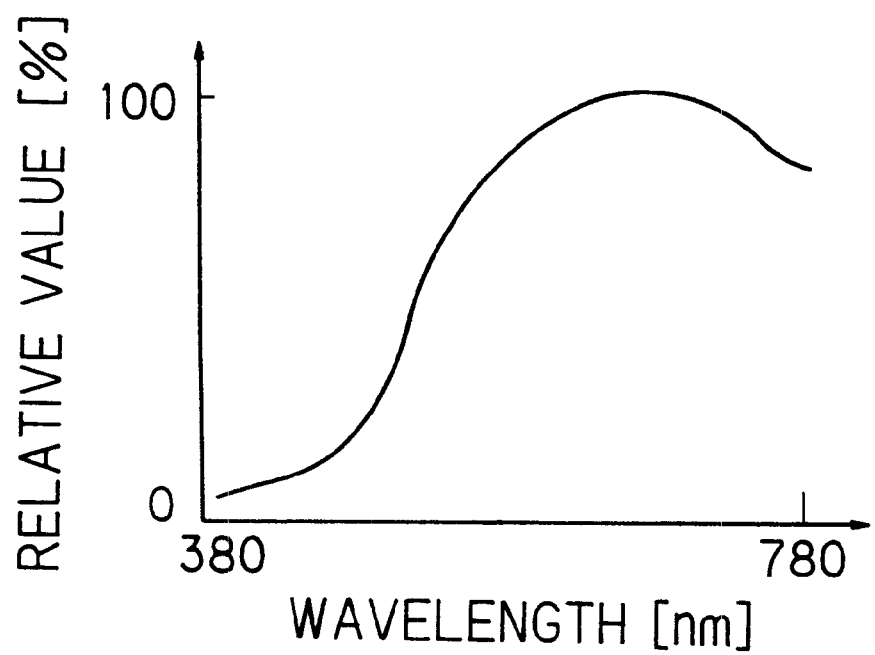
FIG. 2 is a graph showing an example of an output characteristic of an image pick-up device for outputting only a one-channel signal.

By varying the wavelength of the light output from the spectroscope 2, the output signal of the image pick-up device 1 is obtained for each wavelength. Consequently, it is possible to obtain a spectral responsivity characteristic of the image pick-up device 1. For example, when a one-channel output signal such as a monochromatic image is obtained from the image pick-up device 1, an output characteristic of the image pick-up device 1 corresponding to a wavelength can be obtained as shown in FIG. 2.

Figure 3:
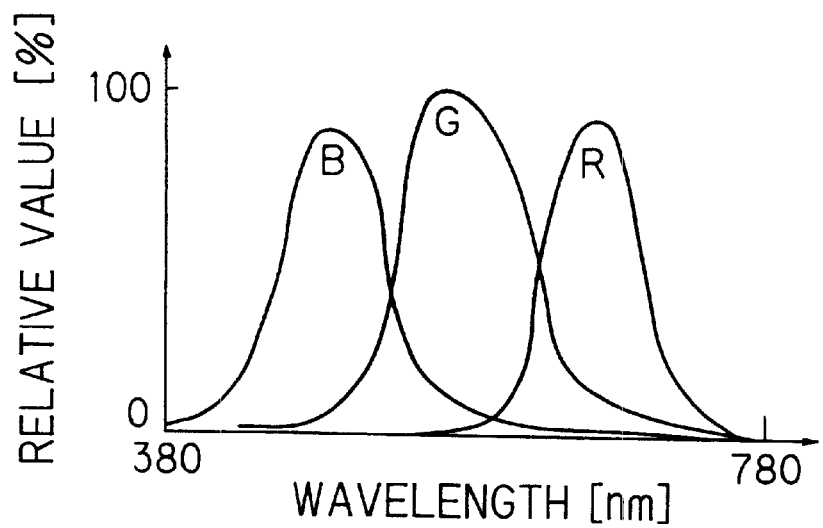
FIG. 3 is a graph showing an example of an output characteristic of an image pick-up device for outputting a three-channel signal.

Moreover, in the case where color signals, for example, three-channel signals such as R, G and B signals are obtained from the image pick-up device 1, the output three-channel signals corresponding to each of varying wavelength of light output from the spectroscope 2 are obtained so that the output characteristic of the image pick-up device 1 corresponding to each of the wavelength can be obtained as shown in FIG. 3.

In the above description, with such a structure as to cause a spectral wavelength range of the emitting terminal 6 of the spectroscope 2 to be visible light, it is possible to obtain the spectral responsivity characteristic of the image pick-up device 1 adapted to human visual characteristics. For example, by such a structure in which a wavelength ranges from 380 nm to 780 nm, it is possible to obtain a spectral responsivity characteristic of the image pick-up device 1 which can have matching with a Class 1 spectrophotometer of Japanese Industrial Standard JIS Z 8722.

Figure 4:
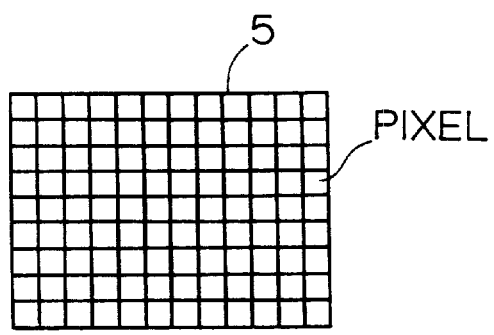
FIG. 4 is a diagram showing an arrangement of a plurality on pixels of a solid-state image sensor.
Figure 5:
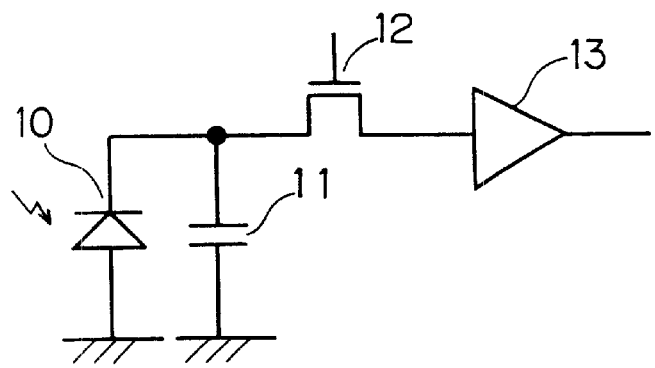
FIG. 5 is a circuit diagram showing of a structure of the solid-state image sensor.

The signal obtained from the image pick-up device 1 includes a nonlinear characteristic in the image pick-up device 1. For example, the solid-state image sensor 5 is constituted by a plurality of pixels as shown in FIG. 4. Examples of the solid-state image sensor 5 include a CCD, a MOS element and the like. It is assumed that one element has a structure shown in FIG. 5. FIG. 5 depicts a photodiode 10 for performing photoelectric conversion, a capacitor 11 for storing electric charges as a signal, an FET 12 for reading the stored electric charges, and an amplifier 13 for amplifying the read signal. With the above-mentioned structure, if the photodiode 10, the amplifier 13 or the like does not have a linear characteristic for the input light, a signal output from the pixel has a nonlinear characteristic.

Figure 6:
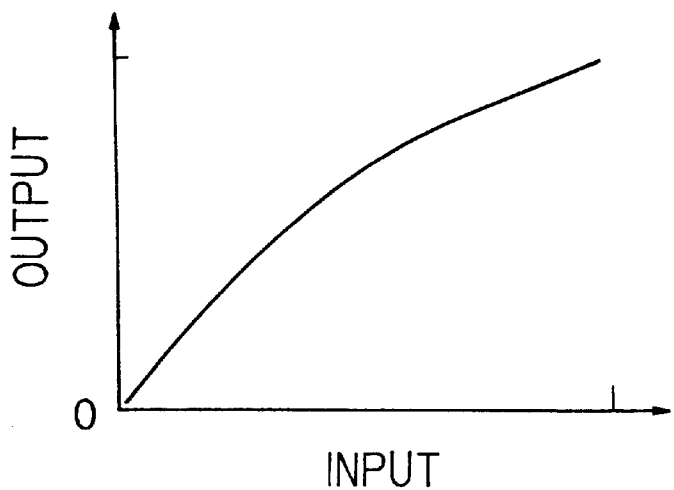
FIG. 6 is a graph illustrating gamma correction.

Furthermore, also in the case where gamma correction shown in FIG. 6 or the like is to be performed in the signal processing by the image pick-up device 1, the signal output from the image pick-up device 1 is caused to have the nonlinear characteristic.

A relationship between the input light and the output signals of the image pick-up device 1 for each wavelength of the input light shown in FIGS. 2 and 3 is a result reflecting the nonlinear characteristic of the image pick-up device 1. If the result is regarded as the spectral responsivity characteristic of the image pick-up device 1 as it is, the spectral responsivity characteristic reflects on the nonlinear characteristic of the image pick-up device 1 and is very inconveniently treated.

For example, in the case where the spectral responsivity characteristic is to be utilized for color management such as conversion of a color space or the like, the addition law in colorimetry is assumed in principle. Therefore, it would be greatly advantageous that the spectral responsivity characteristic is a linear characteristic.

The first operation means 7 executes an operation on an output signal for each pixel of the image sensor 5 in such a manner that the input-output characteristic of the image pick-up device 1 is a linear characteristic or can be regarded as the linear characteristic for the nonlinear characteristic of the image pick-up device 1 (in this case, an input represents a quantity of light to be input to the image pick-up device 1, and an output represents a signal level or a data value).

Figure 7:
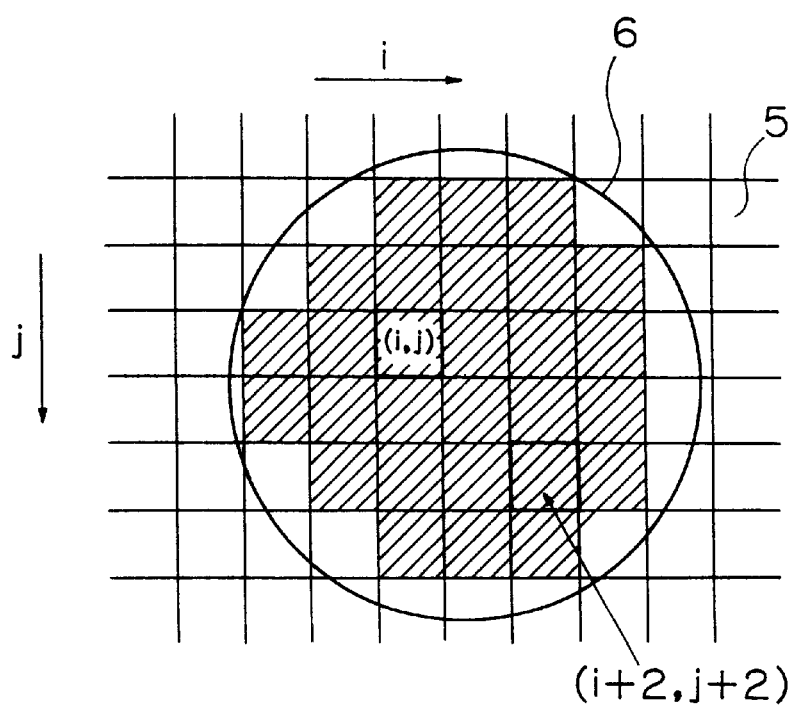
FIG. 7 is a diagram showing an example of an image of an emitting terminal of a spectroscope which is picked up.
Figure 8:
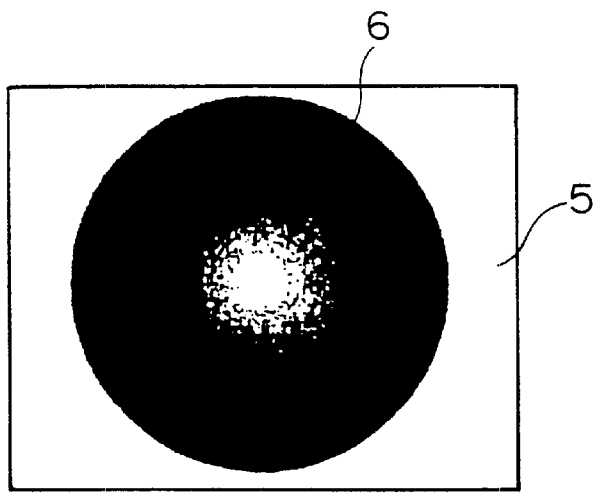
FIG. 8 is a picture showing unevenness in brightness of the emitting terminal of the spectroscope.

FIG. 7 shows an image of the emitted light of the spectroscope 2 which is picked up by the image pick-up device 1. In FIG. 7, a grid represents pixels of the solid-state image sensor 5. Only a portion corresponding to the emitted light of the spectroscope 2 is to be used as a signal for spectral characteristic measurement and is specifically shown by a shaded portion in FIG. 7. However, the emitted light of the spectroscope 2 at the emitting terminal does not have a uniform intensity distribution as shown in FIG. 8. Furthermore, even in the case where a diffusion plate is provided on the emitting terminal 6, the intensity distribution is not completely uniform. If a diffusion plate having a very high diffusibility such as a perfect diffusion plate is used, the emitted light is completely diffused so that a very small quantity of light is incident on the image pick-up device 1. Consequently, it is necessary to enlarge the emitting terminal 6 or extremely increase the quantity of incident light from the light source 3. Thus, the diffusion plate is too unrealistic to perform measurement with high precision.

Figure 9:
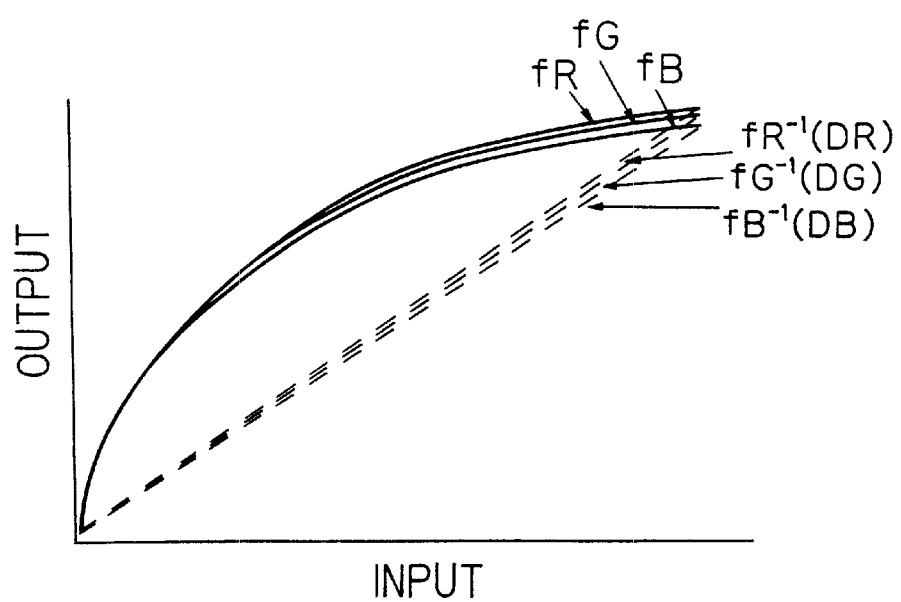
FIG. 9 is a graph showing a nonlinear characteristic of the image pick-up device.
Figure 10:
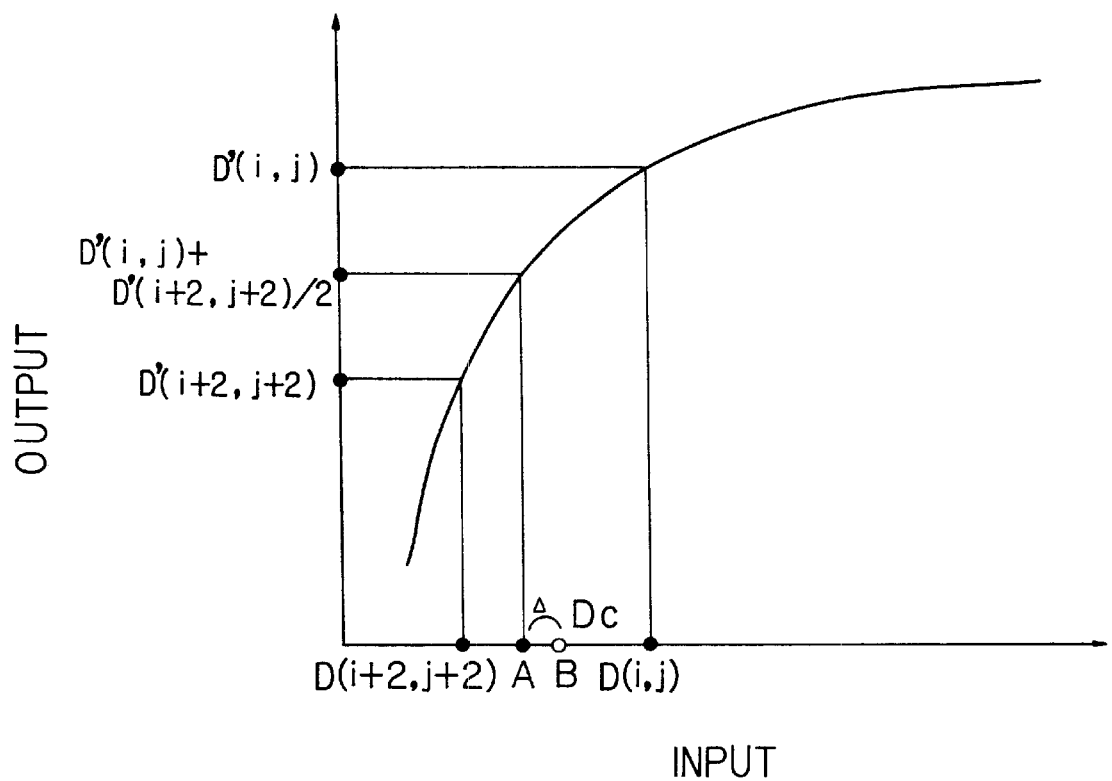
FIG. 10 is a graph showing enlarged detail of FIG. 9.

For example, a nonlinear characteristic fc of the image pick-up device 1 is assumed to be a characteristic shown in FIG. 9. If three color components of output signals such as R, G and B are obtained from the image pick-up device 1, three gradation characteristics such as fR, fG and fB are obtained from the input-output characteristic of the image pick-up device 1 as shown in FIG. 9. FIG. 10 is a graph showing an enlarged part of one of the three characteristics.

In FIG. 7, it is assumed that a signal output from the image pick-up device 1 at a position (i, j) is represented by D'(i, j) and a signal output from the image pick-up device 1 at a position (i+2, j+2) is represented by D'(i+2, j+2). In this case, values D(i, j) and D(i+2, j+2) which are obtained by the first operation means 7 are shown in FIG. 10.

The second operation means 8 calculates a mean value of results of the operations for pixels which are obtained by the first operation means 7. By obtaining a signal (or data) for each wavelength from the second operation means 8, the spectral responsivity characteristic of the image pick-up device 1 which is a linear characteristic can be acquired.

The above-mentioned processing is performed for each pixel of the solid-state image sensor 5 by the first operation means 7 for the following reason. As regards pixels at the positions (i, j) and (i+2, j+2), for example, the mean value of the signals obtained from the image pick-up device 1 is (D'(i, j)+D'(i+2, j+2))/2. The mean value is a value on a point A as shown in FIG. 10. However, an error ΔDc is produced between the value on the point A and Dc(λ) on a point B obtained from D(i, j) and D(i+2, j+2) which actually represents a linear characteristic.

Accordingly, an operation for canceling the nonlinear characteristic is executed for a signal of each pixel of the solid-state image sensor 5 outputted from the image pick-up device 1. The value Dc is calculated from a mean value of the obtained signals for the pixels. Thus, a spectral responsivity characteristic having less errors can be derived.

Second Embodiment

As described in the first embodiment, each signal for each wavelength which shows the linear characteristic of the image pick-up device 1 is represented by Dc(λ). The symbol "c" denotes the color component of a signal obtained from the image pick-up device 1 and represents only one channel (i.e., one color component) for the signal obtained from a monochromatic image pick-up device, and c=R, G and B for the signals obtained from a color image pick-up device for outputting R, G and B signals. If a nonlinear characteristic due to the amplifier 13 or the like in the solid-state image sensor described above is indicated as fsc and a nonlinear characteristic due to a gamma characteristic in a signal processing is indicated as frc, a signal Dc'(λ) obtained from the emitting terminal of the image pick-up device 1 can be represented by the following Equation:

$$Dc'(\lambda) = frc(fsc(Dc(\lambda))) \quad (1)$$
$$= fc(Dc(\lambda))$$

wherein fc=frc (fsc) is set and c denotes color component of an output signal. The output signal has only one channel in a monochromatic image pick-up device and fc is fR, fG and fB in an RGB color image pick-up device. While the nonlinear characteristic of the image pick-up device has been described by taking fsc and frc as examples in the present embodiment, all characteristics of other image pick-up devices causing nonlinearity are set as a function of fc, thereby obtaining the same effects.

Accordingly, a spectral responsivity characteristic which is a linear characteristic of the image pick-up device 1 can be calculated by the following Equation based on the output signal D'c(λ) obtained from the image pick-up device 1 by the measurement described in the first embodiment.

$$Dc(\lambda) = fc^{-1}(Dc'(\lambda)) \quad (2)$$

If a signal output from the image pick-up device 1 at a position (i, j) is represented by D'(i, j) and a signal output from the image pick-up device 1 at a position (i+2, j+2) is represented by D'(i+2, j+2) in FIG. 7, values D(i, j) and D(i+2, j+2) are obtained through an inverse function of fc as shown in FIG. 9. By the Equation (2) for calculating the spectral responsivity characteristic, a value for each wavelength obtained from the image pick-up device 1 is derived as a value corresponding to the shaded portion of FIG. 7. Therefore, the replacement with a pixel unit of the solid-state image sensor 5 produces the following Equation.

$$Dc(\lambda) = fc^{-1}(\Sigma Dc'ij(\lambda)/n) \quad (3)$$

ij: a position of a pixel of the solid-state image sensor 5
n: the number of pixels used for calculation According to the Equation (3), taking note of only pixels at the positions (i, j) and (i+2, j+2), (ΣDc'ij(λ)/n) in the Equation (3) is equal to (D'(i, j)+D'(i+2, j+2))/2 and Dc(λ) is equal to fc⁻¹ ((D'(i, j)+D'(i+2, j+2))/2) as shown in FIG. 10. However, an error ΔDc is produced between Dc(λ) shown in FIG. 10 and Dc(λ) obtained from D(i, j) and D(i+2, j+2) which actually has a linear characteristic.

Accordingly, as regards the spectral characteristic of the image pick-up device 1, a signal for each pixel of the solid-state image sensor 5 outputted from the image pick-up device 1 is subjected to the inverse function of fc indicative of the nonlinear characteristic. Dc is calculated from a mean value of the signals obtained for the pixels. Consequently, a spectral responsivity characteristic having less errors can be derived. Accordingly, the spectral responsivity characteristic can be calculated by the following Equation.

$$Dc(\lambda) = \sum Dcij(\lambda)/n \qquad (4)$$
$$= \sum fc^{-1}(Dc'ij(\lambda))/n$$

Dcij: a value obtained by subjecting Dc'ij(λ) for each pixel to an inverse function of a nonlinear characteristic
ij: a position of a pixel on the solid-state image sensor 5
n: the number of pixels used for calculation While the signal for each pixel of the solid-state image sensor 5 has been described at first in order to obtain the spectral responsivity characteristic of the image pick-up device 1 in the present embodiment, the spectral responsivity characteristic can similarly be obtained by performing a calculation by the Equation (4) based on each pixel of the obtained image in the image pick-up device 1 having the solid-state image sensor 5 in which a plurality of color filters are sequentially arranged along the surface thereof or the like. In the solid-state image sensor 5 having the Bayer arrangement, for example, the color filters are sequentially arranged like R, G, R, G . . . in a line on the surface thereof and G, B, G, B . . . in the next line. On the other hand, in the case where an image output from the image pick-up device 1 takes R, G and B signals for each pixel, the spectral responsivity characteristic of the R signal can be calculated based on a mean value obtained by causing the R signal for each pixel of the image to be subjected to the inverse function of the nonlinear characteristic of the image pick-up device 1, and so are the G and B signals.

Figure 11:
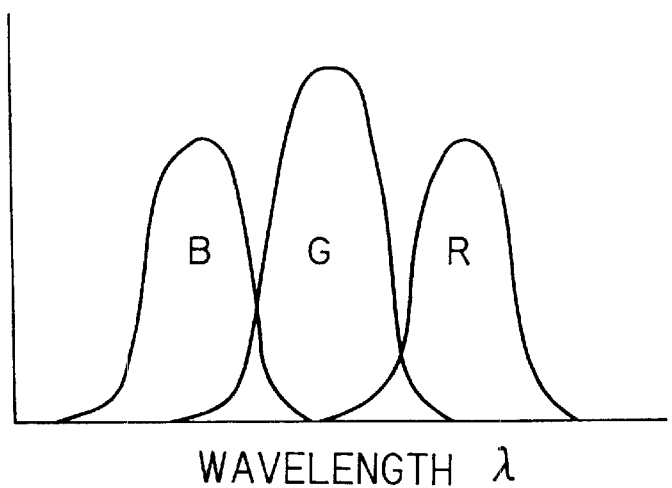
FIG. 11 is a graph illustrating output characteristic of the image pick-up device.
Figure 12:
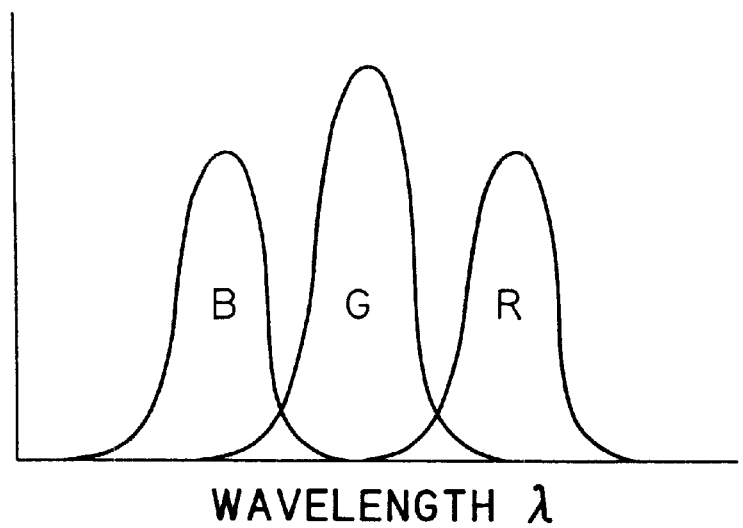
FIG. 12 is a graph illustrating the spectral responsivity characteristic of the image pick-up device.

Thus, the mean value of the values obtained through the inverse function of the nonlinear characteristic of the image pick-up device 1 for each pixel is obtained for each wavelength. Consequently, even if an output characteristic shown in FIG. 11 is obtained from the image pick-up device 1, for example, it is possible to acquire a spectral responsivity in which the input-output characteristic of the image pick-up device 1 is a linear characteristic as shown in FIG. 12.

Figure 13:
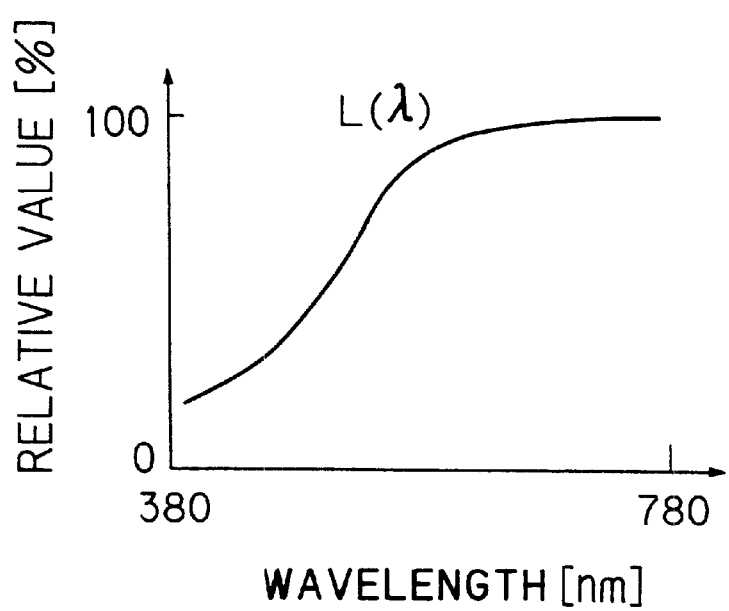
FIG. 13 is a graph showing a spectral distribution of light output from the spectroscope.

Furthermore, in the case where light L(λ) emitted from the spectroscope 2 is not flat in a wavelength region to be measured as shown in FIG. 13, the spectral responsivity characteristic indicated by the Equation (4) can be calculated by Equation (5).

$$Dc(\lambda)=\Sigma fc^{-1}(Dc'ij(\lambda))/nL(\lambda) \qquad (5)$$

Dcij: a value obtained by subjecting Dc'ij(λ) for each pixel to an inverse function of a nonlinear characteristic
ij: a position of a pixel on the solid-state image sensor 5
n: the number of pixels used for calculation
L(λ): a spectral characteristic of light emitted from the spectroscope Third Embodiment In the case where a spectral responsivity of an image pick-up device 1 has a negative sensitivity, the negative spectral responsivity can be measured by adding illumination light from another light source to a solid-state image sensor 5 in FIG. 1 separately from the light emitted from a spectroscope 2 to the solid-state image sensor 5 and by subtracting a signal part arising from the illumination light of the another light source from the result obtained by the measurement in each of the first and second embodiments.

Suppose that the light emitted from the spectroscope 2 is set to 0, and then an output signal 1 of the image pick-up device 1 which is obtained by illuminating the solid-state image sensor 5 only using another light source is represented by Dc0, wherein c represents the channels (color components) of the output signal of the image pick-up device 1. For example, when RGB signals are output, DR0, DG0 and DB0 are obtained. If a nonlinear characteristic of the image pick-up device 1 is indicated as fc (c represents output channels of the image pick-up device 1), data having a linear characteristic obtained by correcting the nonlinear characteristic is indicated as $f^{-1}$ (Dc0). Accordingly, the first operation means 7 shown in FIG. 1 executes an operation in such a manner that an output signal for each pixel is caused to have a linear characteristic, and a signal arising from illumination from the another light source is subtracted for each pixel. The operation to be executed by the first operation means 7 is expressed by Equation (6):

$$Dc(\lambda)=\Sigma[fc^{-1}(Dc'ij(\lambda))-fc^{-1}(Dc'ij0)] \qquad (6)$$

wherein i and j represent a pixel position on the solid-state image sensor 5.

Next, a mean value of the output signals of the first operation means is calculated by the second operation means as is expressed by the following Equation (7).

$$Dc(\lambda)=\Sigma[fc^{-1}(Dc'ij(\lambda))-fc^{-1}(Dc'ij0)]/n \qquad (7)$$

By the above-mentioned operations, the negative spectral responsivity characteristic of the image pick-up device 1 can be measured.

Forth Embodiment

Figure 14:
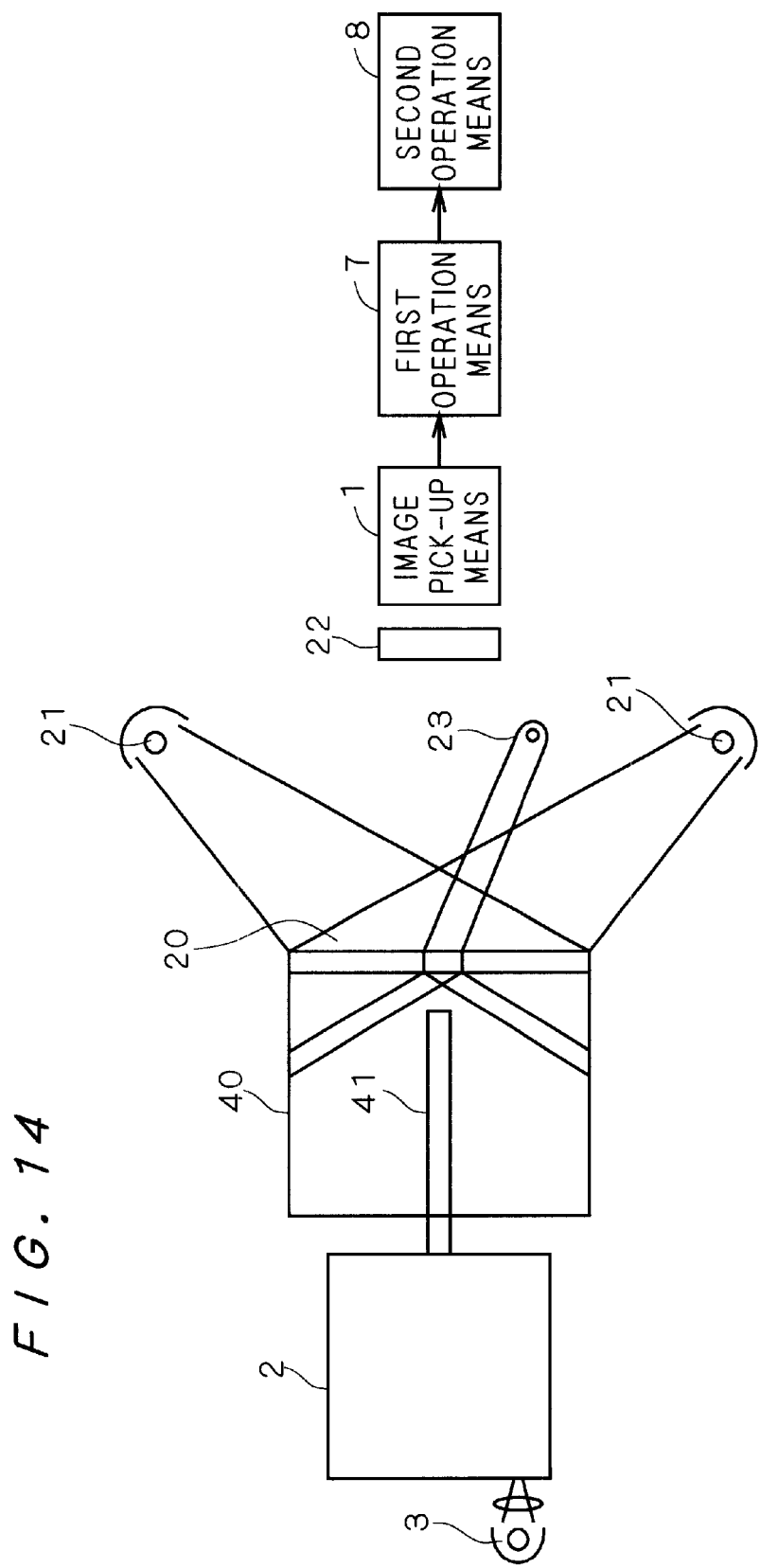
FIG. 14 is a diagram showing a device according to the fourth embodiment.
Figure 15:
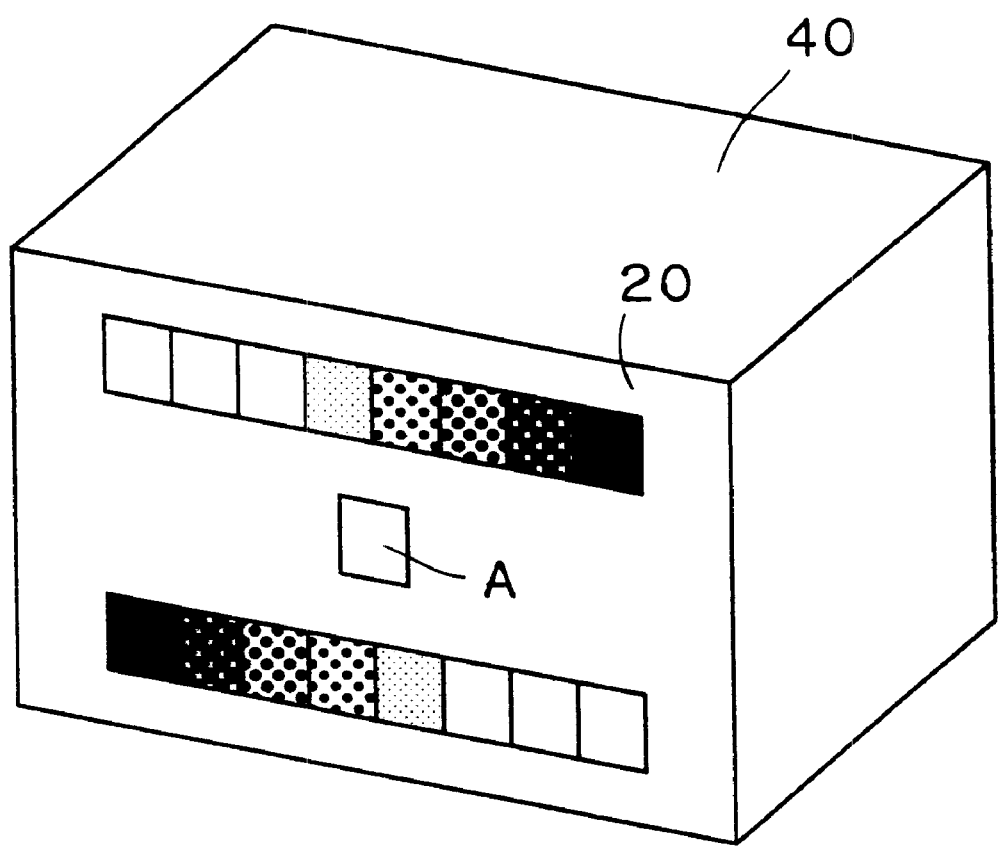
FIG. 15 is a perspective view of a dark box.

FIG. 14 shows another measuring device. In this configuration, a test chart 20 for measurement is stuck on a dark box 40. Further, a main light source 21 for illuminating the test chart 20, a color temperature conversion filter 22 for adjusting a color temperature of the main light source 21, and an auxiliary light source 23 are used. An example of the test chart 20 is shown in FIG. 15. A coating material having a low reflectance is applied to the inside of the dark box 40, on which the test chart 20 is stuck so that light incident on the inside of the dark box 40 is absorbed therein. Moreover, a central part A of the test chart 20 has a hole. Gray scale charts are arranged over and below the central part A. If the chart 20 has a hole in a central part thereof, other portions can be wholly gray.

First of all, light having a short wavelength is emitted from a spectroscope 2 as described in the first embodiment. The light outputted from the spectroscope 2 is transmitted by an optical transmitter 41 such as an optical fiber, and is emitted from the tip of the optical transmitter 41 through the hole A of the test chart 20 onto the image pick-up device 1. An emitting terminal (i.e., the tip) of the optical transmitter 41 is provided at a position where it is not exposed to light from the main light source 21 illuminating the whole face of the test, chart 20. The image pick-up device 1 picks up an image of the test chart 20 illuminated by the main light source 21 and that of the emitting terminal of the optical transmitter 41 at the same time. Single light is emitted from the spectroscope 2 in the range from 380 nm to 780 nm at an interval of 5 nm, for example. Only data corresponding to the position of the emitting terminal of the optical transmitter 41 is sampled from the image picked up by the image pick-up device 1 for each light at an interval of 5 nm.

First operation means 7 executes the operation described in each of the first and second embodiments for each pixel of an image pick-up device in data on the position of the optical power terminal which has been sampled. A gradation characteristic of the image pick-up device 1 to be used for the operation by the operation means 7 can be measured by a measuring device shown in FIG. 14. To obtain the gradation characteristic, gray chips having the same shape as the shape of the hole portion of the test chart 20 and various reflectances are sequentially fitted in the hole portion, and the images of the test chart 20 including the gray chips having various reflectances are picked up by the image pick-up device 1. The gradation characteristic can be calculated from the output signal or data of the image pick-up device 1 corresponding to a position of the gray chips. In this case, the image of the gray chips are always picked up in the central part of the test chart 20. Therefore, a deterioration in a circumferential light quantity of a lens of the image pick-up device 1 can be avoided and the illuminated light can be adjusted by the main light source 21. Consequently, an unevenness among the data for various pixels can be eliminated.

The gray chip has i steps of reflectances, e.g., sixteen steps of reflectances. A gray chip having a reflectance of 0% can be realized by stopping emission from the spectroscope 2 and picking up an image in the hole portion A. Moreover, when the gradation characteristic is to be measured, the gray chip is fitted in the hole portion A. Therefore, the image of the emitting terminal of the optical transmitter 41 cannot be picked up by the image pick-up device 1. A relationship between a brightness value on a face of the gray chip obtained when the image of each gray chip is to be picked up and an output value Dc(i) of the image pick-up device 1 which is obtained at that time represents the gradation characteristic of the image pick-up device 1. The gradation characteristic can be calculated by plotting data corresponding to the sixteen steps of gray chips. The gradation characteristic usually becomes a nonlinear characteristic, which is represented by fc in the second embodiment.

The first operation means 7 executes an operation for changing the nonlinear characteristic of the image pick-up device 1 into to a linear characteristic. In this operation, it is sufficient that an inverse function $fc^{-1}$ of fc which is the gradation characteristic operates to data for each pixel of the solid-state image sensor 5. The inverse function $fc^{-1}$ is an inverse function of the function derived by plotting, with a straight line segments, the data obtained earlier by picking up the images of the sixteen steps of color chips.

Second operation means 8 calculates a mean value of the results of the operations on the signal values for pixels performed by the first operation means 7. Thus, the spectral responsivity characteristic of the image pick-up device 1 can be obtained.

Furthermore, the auxiliary light source 23 serves to illuminate only the emitting terminal of the optical transmitter 41 through the hole A of the test chart 20 and to obtain the negative spectral responsivity characteristic described in the second embodiment. To measure the negative spectral responsivity characteristic, at first monochromatic light is not emitted from the spectroscope 2, but only the light from the auxiliary light source 23 is illuminated. In this configuration, the output data of the image pick-up device 1 corresponds to Dc'ij0 of the Equation (6) described in the second embodiment and is changed into a value on the linear characteristic through the inverse function $fc^{-1}$ in the same manner.

Fifth Embodiment

Figure 16:
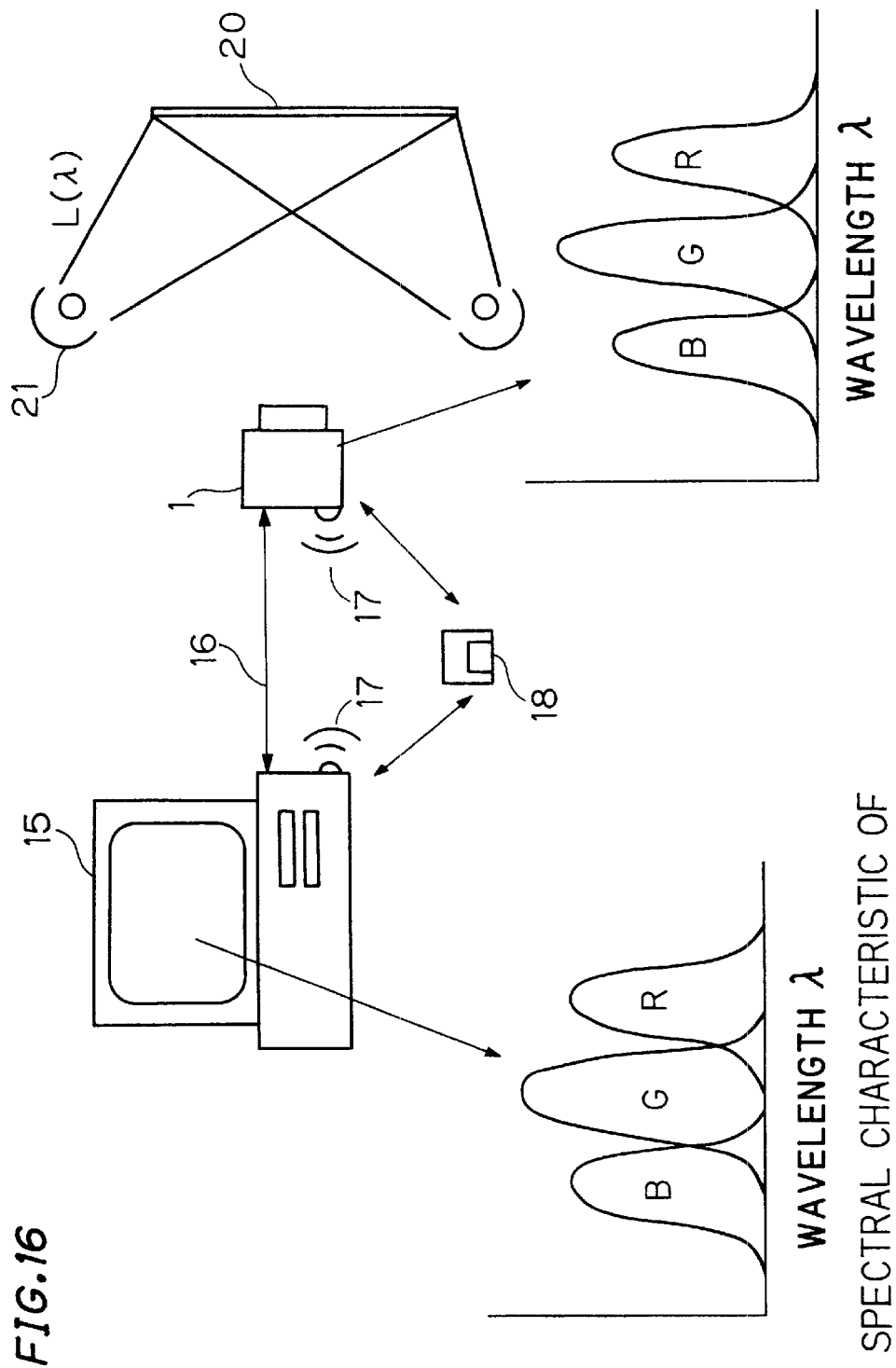
FIG. 16 is a diagram showing a structure of a device according to the fifth embodiment.

FIG. 16 is a diagram showing a configuration in which data on an image picked up by an image pick-up device 1 is output to an image output device 15. The data on the image picked up by the image pick-up device 1 is transferred as an image file for each image to the image output device 15. The transfer is performed through serial/parallel communication by means of a cable 16 for directly connecting the image pick-up device 1 to the image output device 15 or is performed through an infrared communication device 17, a storage medium 18 and the like.

In the prior art, imaging data outputted from the image pick-up device 1 and transferred to the image output device 15 has either included only the data on the image picked up by the image pick-up device 1, or, the imaging data has been constituted by adding simple record data such as a photographing date to the image data.

In the case where the spectral responsivity characteristic of the image pick-up device 1 is different from the spectral characteristic of the image output device 15 as shown in FIG. 16, color reproduction of the images picked up by the image pick-up device 1 having different spectral responsivity characteristics is varied even if the same image output device 15 is used. Further, the color reproduction is varied by the different image output devices 15 even if the same image pick-up device 1 is used. Therefore, these color reproducibilities have been designed depending on a designer's intuition.

For these problems, an ideal spectral characteristic is defined for the image output device 15 based on a standard such as the NTSC. Of course, the design should be performed in such a manner that the spectral responsivity characteristic of the image pick-up device 1 should conform to the spectral characteristic. However, an image pick-up device 1 does not have the spectral responsivity characteristic according to the spectral characteristic, due to various problems with the image pick-up device 1. Furthermore, the image output device 15 is not restricted to only the NTSC type but there are various image output devices 15. Therefore, the spectral responsivity characteristic of the image pick-up device 1 cannot be restricted to a certain characteristic.

In the present embodiment, imaging data is constituted by adding the spectral responsivity characteristic of the image pick-up device 1 derived according to the first embodiment to the image data according to the prior art. Consequently, the spectral responsivity characteristic of the image pick-up device 1 is informed of to treat the image data obtained from the image pick-up device 1. Therefore, the spectral responsivity can be used as important data when performing color matching for making color reproducibilities identical in the display on the image output device 15 or the like, for example.

Figure 17:
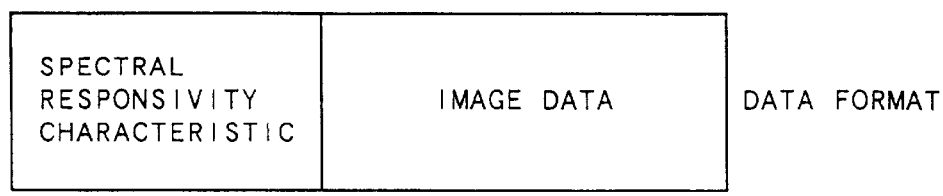
FIG. 17 is a diagram showing an example of a data format according to the fifth embodiment.
Figure 18:
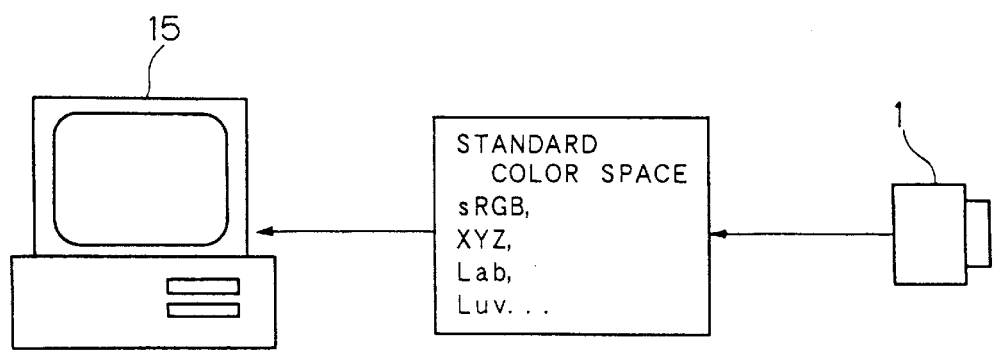
FIG. 18 is a diagram showing a relationship between an image pick-up device and an image output device.

FIG. 17 shows an example of a data format. The data is constituted in the form in which the spectral responsivity characteristic measured according to claim 1 is added as a header or footer portion to a conventional data structure having only image data. By storing or transmitting the data as one image data, the spectral characteristic data of the image pick-up device 1 is transferred to the image output device 15. The image output device 15 can be utilized for color conversion of the image data or the like by using the spectral responsivity characteristic attached to the image data or can compensate for a color reproducibility. For example, in the case where transmitting means for an internet or the like is used as shown in FIG. 18, it is recommended that image data obtained once by R, G and B components and the like should be converted into a standard color space for color management in each type of the apparatus. The standard color space may be any of sRGB, CIELab, CIELuv, XYZ and the like which are defined by IEC61966-2-1. In that case, if the spectral characteristic of the image pick-up device 1 is well known, it is easy to perform conversion into a proper color space.

While a personal computer or a monitor has been shown as the image output device 15 in FIG. 16 according to the present embodiment, the same effects can be obtained by the image output device 15 such as a printer, a projector or the like.

Sixth Embodiment

In the configuration shown in FIG. 16, the following is assumed. The image pick-up device 1 has an image pick-up characteristic adapted to a color space of the image output device 15. For example, the image pick up device 1 has an NTCS image pick-up characteristic if the image output device 15 is an NTSC monitor, and the image pick-up device 1 has an image pick-up characteristic adaptable to an sRGB space if the image output device 15 is based on the sRGB space. In the case where a color chart having a known spectral distribution characteristic ρ(λ) is previously provided on a test chart 20 and an illumination light source 21 has a standard white color defined by the color space, signals of the color chart obtained from the image pick-up device 1 are represented by Rs, Gs and Bs.

By the image pick-up device 1 having spectral responsivities of R(λ), G(λ) and B(λ) obtained from the first embodiment, the signals Rc, Gc and Bc of the color chart obtained under illumination having a spectral distribution characteristic L(λ) are expressed in the following Equations.

$$Rc = \int \rho(\lambda) \times R(\lambda) \times L(\lambda) d\lambda \quad (6)$$

$$Gc = \int \rho(\lambda) \times G(\lambda) \times L(\lambda) d\lambda \quad (7)$$

$$Bc = \int \rho(\lambda) \times B(\lambda) \times L(\lambda) d\lambda \quad (8)$$

For all the color charts in the subject, it is preferable that the following Equations should be formed. If the Equations are not formed, color reproducibility errors are produced.

$$Rs = Rc \quad (9)$$

$$Gs = Gc \quad (10)$$

$$Bs = Bc \quad (11)$$

In order to eliminate the errors, it is preferable that a 3×3 matrix coefficient should be determined in the following Equation.

$$\begin{bmatrix} Rs \\ Gs \\ Bs \end{bmatrix} = \begin{bmatrix} a11 & a12 & a13 \\ a21 & a22 & a23 \\ a31 & a32 & a33 \end{bmatrix} \cdot \begin{bmatrix} Rc \\ Gc \\ Bc \end{bmatrix} \quad (12)$$

Figure 19A:
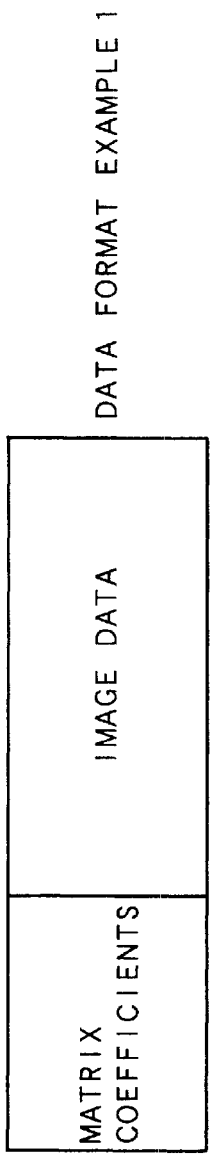
FIGS. 19A and 19B are diagrams showing examples of a data format according to the sixth embodiment.
Figure 19B:
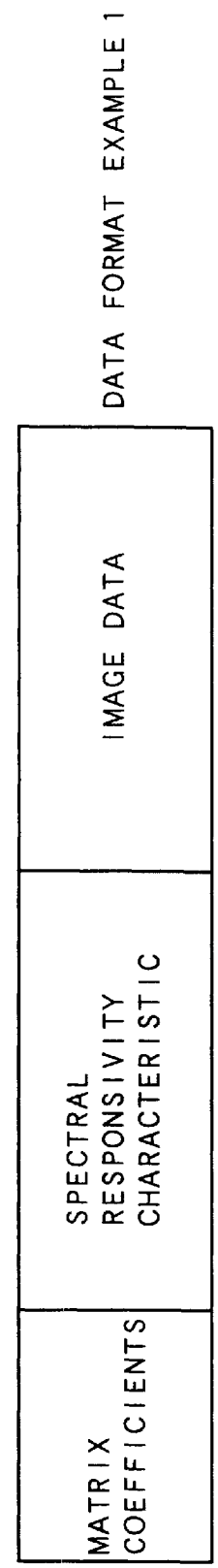
Figure 20:
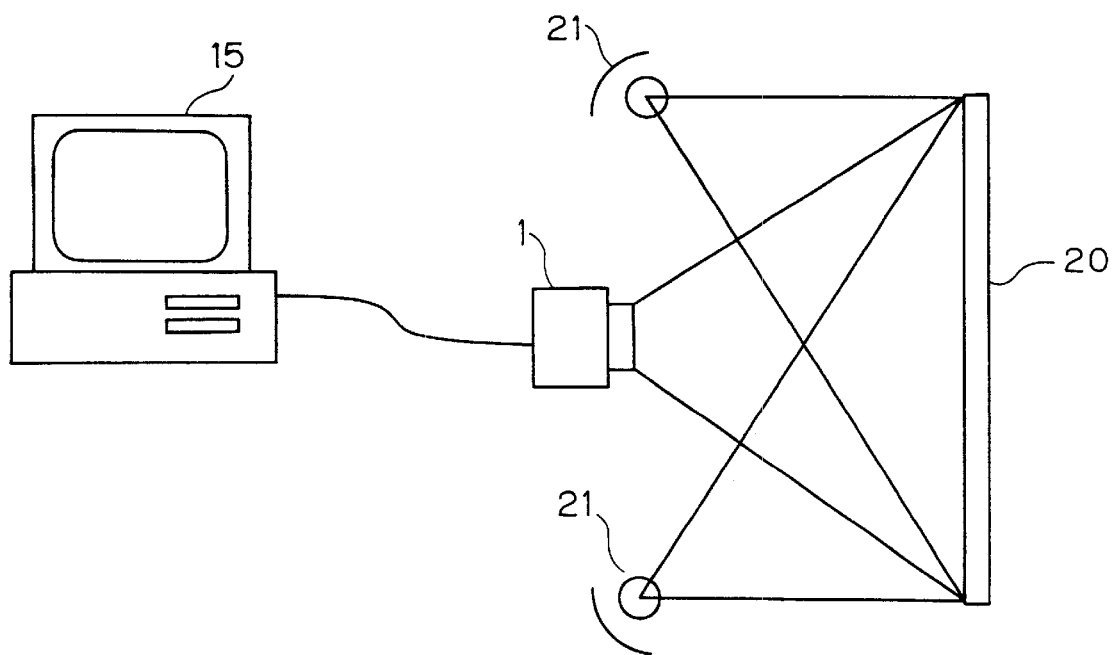
FIG. 20 is a diagram showing a method of measuring an image pick-up device according to the prior art.
Figure 21:
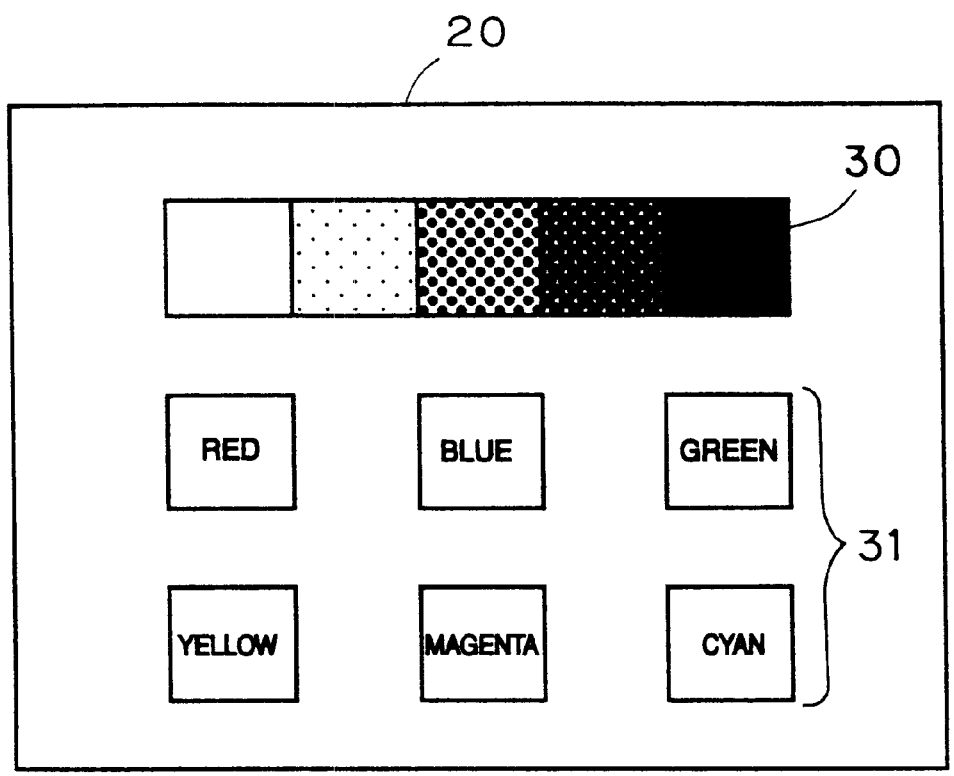
FIG. 21 is a diagram showing an example of a test chart to be used for the method of measuring the image pick-up device according to the prior art.

These coefficients can be obtained by typical color charts corresponding to at least three channels, for example. These nine matrix coefficients of a11 to a33 are attached to image data obtained by the image pick-up device 1. FIGS. 19A and 19B show examples of a data format of an image file. An example 1 (FIG. 9A) indicates data obtained by adding the matrix coefficients to the head of image data. An example 2 (FIG. 9B) indicates data obtained by adding a spectral responsivity characteristic of the image pick-up device 1 and the matrix coefficients to the head of the image data. By adding the nine matrix coefficients of a11 to a33 to the image file, for example, it is possible to compensate for the color reproduction errors with a personal computer or the like.

FIG. 19 shows an example of the data format. It is apparent that the same effects can be obtained if the matrix coefficients are added to a part of the image data.

While the image pick-up device having one channel or three channels of R, G and B has been described above, the measuring method according to the present invention is effective in any type of image pick-up devices having N channels (N is a natural number).

Based on a spectral distribution characteristic of any type of optional light sources, a spectral reflectance characteristic of any type of optional subjects and a spectral responsivity characteristic of any type of image pick-up devices to be measured which is obtained by the present invention, an output signal of the image pick-up device can be calculated and image pick-up signals related to various colors of the image pick-up device can be calculated with high precision. For example, if N is fully increased, it is also possible to estimate, with high precision, the spectral reflectance characteristic of the optional subject based on the spectral distribution characteristic of the light source, the spectral responsivity characteristic of the image pick-up device to be measured which is obtained by the present invention and a signal obtained by picking up the image of any of the subjects.

While the invention has been described in detail, the foregoing description is in all aspects illustrative and not restrictive. It is understood that numerous other modifications and variations can be devised without departing from the scope of the invention.

What is claimed is:

1. A method of measuring spectral responsivity characteristic of image pick-up device comprising the steps of:
   (a) preparing an image pick-up device having an image sensor including plural pixels arranged, a light source, and a spectroscope for spectrally separating a light from said light source and outputting separated light from an emitting terminal thereof;
   (b) picking-up an image of said emitting terminal which is outputting said separated light by said image pick-up device;
   (c) performing a correction to each of plural image signals corresponding to at least one color component and said plural pixels that are outputted by said image pick-up device during said step (b) so that a gradation characteristic of said image pick-up device is corrected from non-linearity to one closer to linearity; and
   (d) calculating, as a spectral responsivity characteristic for said separated light, a mean value of said plural image signals after said correction by averaging the same over a certain range within said plural pixels, wherein said certain range is included in an image of said emitting terminal, and wherein, in varying a wavelength of said separated light, steps (b), (c), and (d) are repeatedly executed so as to obtain said spectral responsivity characteristic for plural wavelengths.

2. The method according to claim 1, wherein
   in said step (c), a value of an inversion function of a function that expresses said non-linearity in said gradation characteristic is calculated for each of said plural image signals whereby said correction is performed.

3. The method according to claim 1, wherein
   in said step (d), using a spectral characteristic that expresses an intensity of said separated light for each of said plural wavelengths, said mean value is corrected as said spectral responsivity characteristic so as to reduce an influence of difference in said intensity among said plural wavelengths.

4. The method according to claim 1, wherein
   in said step (a), another light source for illuminating said emitting terminal is further prepared,
   in said step (b), illuminating said emitting terminal with said another light source, said image of said emitting terminal is picked-up by said image pick-up device, and in said step (c), in addition to said correction, another correction to subtract a signal component resulting from said another light source is performed to each of said plural image signals.

5. The method according to claim 1, wherein in said step (a), a box that has a hole selectively opened at a pass of said separated light from said emitting terminal to said image pick-up device and an illumination light source for emitting such an illumination light as to reach said hole and a portion of a surface of said box surrounding said hole but not to reach said emitting terminal are further prepared, and said method further comprises a step of (e) sequentially fitting plural color chips having different reflectances in said hole, while picking-up images of said plural color chips with said image pick-up device, and thereby measuring said non-linearity in said gradation characteristic on a basis of image signals sequentially output by said image pick-up device.

6. A method of configuring imaging data comprising the steps of:

(A) preparing an image-pick up device;

(B) obtaining an image data that represents an image of a subject as an output signal of said image pick-up device; and (C) adding a data that represents a spectral responsivity characteristic of said image pick-up device to said image data, wherein said image pick-up device has an image sensor including plural pixels arranged, said method further comprising the steps of:

(a) further preparing a light source and a spectroscope for spectrally separating a light from said light source and outputting separated light from an emitting terminal thereof;

(b) picking-up an image of said emitting terminal which is outputting said separated light by said image pick-up device;

(c) performing a correction to each of plural image signals corresponding to at least one color component and said plural pixels that are outputted by said image pick-up device during said step (b) so that a gradation characteristic of said image pick-up device is corrected from non-linearity to one closer to linearity; and (d) calculating, as said spectral responsivity characteristic of said image pick-up device for said separated light, a mean value of said plural image signals after said correction by averaging the same over a certain range within said plural pixels, wherein said certain range is included in an image of said emitting terminal and wherein, in varying a wavelength of said separated light, steps (b), (c), and (d) are repeatedly executed so as to obtain said spectral responsivity characteristic for plural wavelengths.

7. The method according to claim 6, further comprising a step of (D) adding, to said image data, a conversion coefficient between a first signal obtained from said image-pick up device when an image of a color chart is picked-up by said image pick-up device under an illumination of a standard white color and a second signal obtained from said image-pick up device when an image of said color chart is picked-up by said image pick-up device under an illumination having a particular spectral distribution characteristic.

8. A method of configuring imaging data comprising the steps of:

(A) preparing an image-pick up device;

(B) obtaining an image data that represents an image of a subject as an output signal of said image pick-up device; and (C) adding, to said image data, a conversion coefficient between a first signal obtained from said image pick-up device when an image of a color chart is picked up by said image pick-up device under an illumination of a standard white color and a second signal obtained from said image pick up device when an image of said color chart is picked up by said image pick-up device under an illumination having a particular spectral distribution characteristic, wherein said image pick-up device has an image sensor including plural pixels arranged, said method further comprising the steps of:

(a) further preparing a light source and a spectroscope for spectrally separating a light from said light source and outputting separated light from an emitting terminal thereof;

(b) picking-up an image of said emitting terminal which is outputting said separated light by said image pick-up device;

(c) performing a correction to each of plural image signals corresponding to at least one color component and said plural pixels that are outputted by said image pick-up device during said step (b) so that a gradation characteristic of said image pick-up device is corrected from non-linearity to one closer to linearity; and (d) calculating, as a spectral responsivity characteristic of said image pick-up device for said separated light a mean value of said plural image signals after said correction by averaging the same over a certain range within said plural pixels, wherein said certain range is included in an image of said emitting terminal, wherein, in varying a wavelength of said separated light, steps (b), (c), and (d) are repeatedly executed so as to obtain said spectral responsivity characteristic for plural wavelengths, and wherein said second signal is obtained by integrating, with respect to a wavelength, a product among a spectral distribution characteristic of said color chart, said particular spectral distribution characteristic of said illumination and said spectral responsivity characteristic obtained by said step (d).

* * * * *